F. T. ROBERTS.
MOLD FOR MAKING RUBBER ARTICLES.
APPLICATION FILED JUNE 24, 1918.
1,329,312.
Patented Jan. 27, 1920.
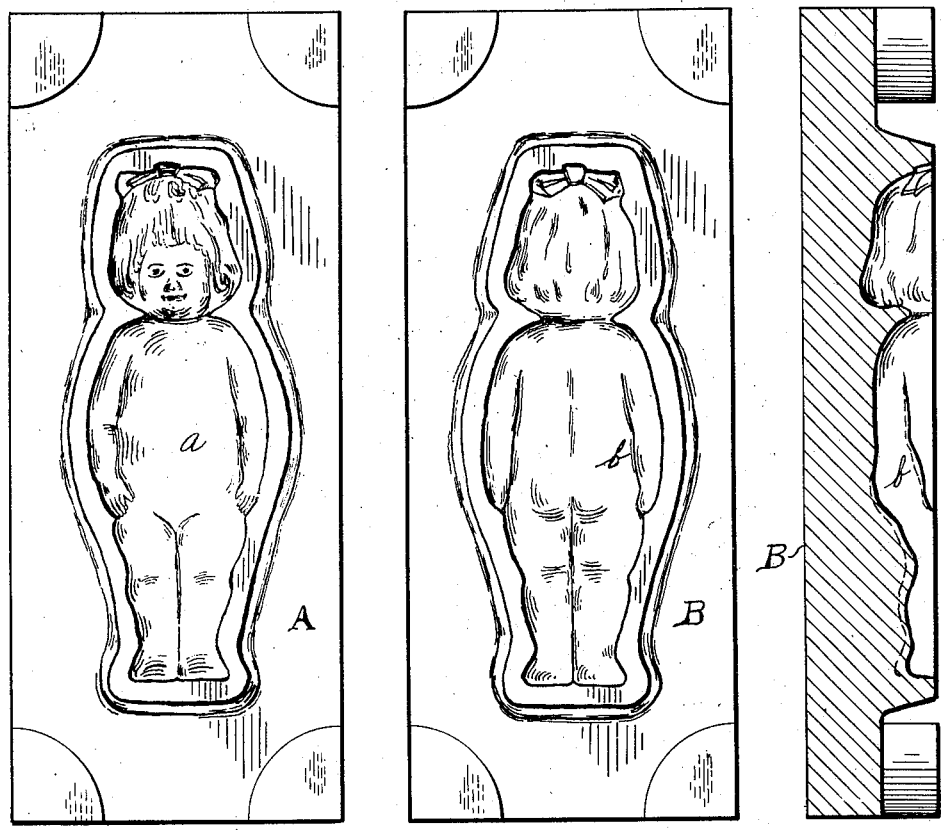
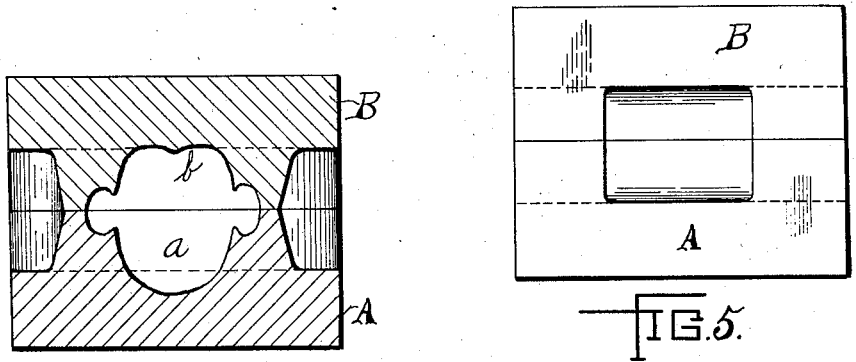

UNITED STATES PATENT OFFICE.

FRED THOMAS ROBERTS, OF CLEVELAND, OHIO.

MOLD FOR MAKING RUBBER ARTICLES.

1,329,312.  Specification of Letters Patent.  Patented Jan. 27, 1920.

Application filed June 24, 1918. Serial No. 241,469.

*To all whom it may concern:*

Be it known that I, FRED THOMAS ROBERTS, a citizen of the United States, residing at Cleveland, in the county of Cuyahoga and State of Ohio, have invented a certain new and useful Improvement in Molds for Making Rubber Articles, of which the following is a full, clear, and exact description, reference being had to the accompanying drawings.

In the manufacture of the various rubber articles it has been customary to employ molds made of cast iron with the mold surfaces machined according to the contour of the article. Where the article to be molded has an irregular contour, the corresponding machining of the mold has been very expensive. It has not been practical however, to employ cast iron molds for the surface has been too rough to produce the desired finish on the rubber article. Molds of white metal cast on a metal matrix have been employed, but this method is also expensive in making the matrix.

I have found that I can produce a very satisfactory sand cast mold for the manufacture of rubber articles by employing an aluminum alloy which is free from ingredients which will unite with the sulfur compound in the rubber article. For this purpose I preferably employ an alloy of approximately ninety-seven per cent. of aluminum and three per cent. of magnesium, these metals being melted and thoroughly mixed together. Such an alloy may be sand-cast with a smooth surface to be effectively used without machining; nor is it affected by the sulfur or other ingredients of the rubber.

Molds made of my aluminum alloy may be employed very satisfactorily in vulcanizing the article. The high conductivity of the aluminum is an additional advantage over the usual iron mold.

The drawings illustrate my mold embodied in a form for making an irregular article—specifically a rubber doll. Figures 1 and 2 are plans of two members of a vulcanizing mold; Fig. 3 is a longitudinal section of one of the mold members; Fig. 4 is a cross section through the two mold members in coaction; Fig. 5 is an end view of the coacting mold members.

In the drawings, A and B represent two mold plates or members and $a$ and $b$ the cavities therein. These plates or blocks are sand-cast with cavities of a contour dependent upon the shape of the article. The blocks, as stated, are of aluminum alloy which is not altered by the ingredients of the rubber, this alloy being preferably about ninety-seven per cent. aluminum and three per cent. magnesium.

Whether my special mold blocks are to be used for forming the article or for vulcanizing it I find that the aluminum-magnesium alloy is very beneficial in that it enables a smooth cavity or other contour to be sand-cast with the requisite smooth rim, while the material is hard enough to withstand much wear. It is readily apparent that in the manufacture of various irregular articles it is very difficult and expensive to machine the mold cavities, whereas they may be very readily cast. For instance, a pattern may be made corresponding to the article, a plaster of Paris cast taken from this pattern and this cast used as a pattern in a sand mold, and then the aluminum alloy block cast in this sand mold. My blocks may therefore be made accurately and very cheaply. After being cast the cavities need no attention other than an occasional rubbing with emery cloth.

For many uses, a number of the molds may be cast and mounted on a pair of carrier plates of suitable material; or the multiple cavities may be integrally cast—my alloy being well adapted to act as the carrier for the molds proper.

Having thus described my invention, what I claim is:

1. As a new article of manufacture, a mold for making rubber articles, said mold having at least a portion forming the molding surface made of an alloy composed of a large per cent. of aluminum and a comparatively small per cent. of magnesium.

2. As a new article of manufacture, a mold for making rubber articles composed of an alloy of aluminum and magnesium in about the proportions mentioned.

3. A mold for making rubber articles comprising sand cast blocks made of an alloy of aluminum and magnesium in about the proportions mentioned.

4. As a new article of manufacture, a mold for making rubber articles composed of a sand cast block of an alloy of aluminum and magnesium in about the proportions mentioned, said mold having its cavity in use substantially as cast and without machining.

In testimony whereof, I hereunto affix my signature.

FRED THOMAS ROBERTS.